Figure 1:
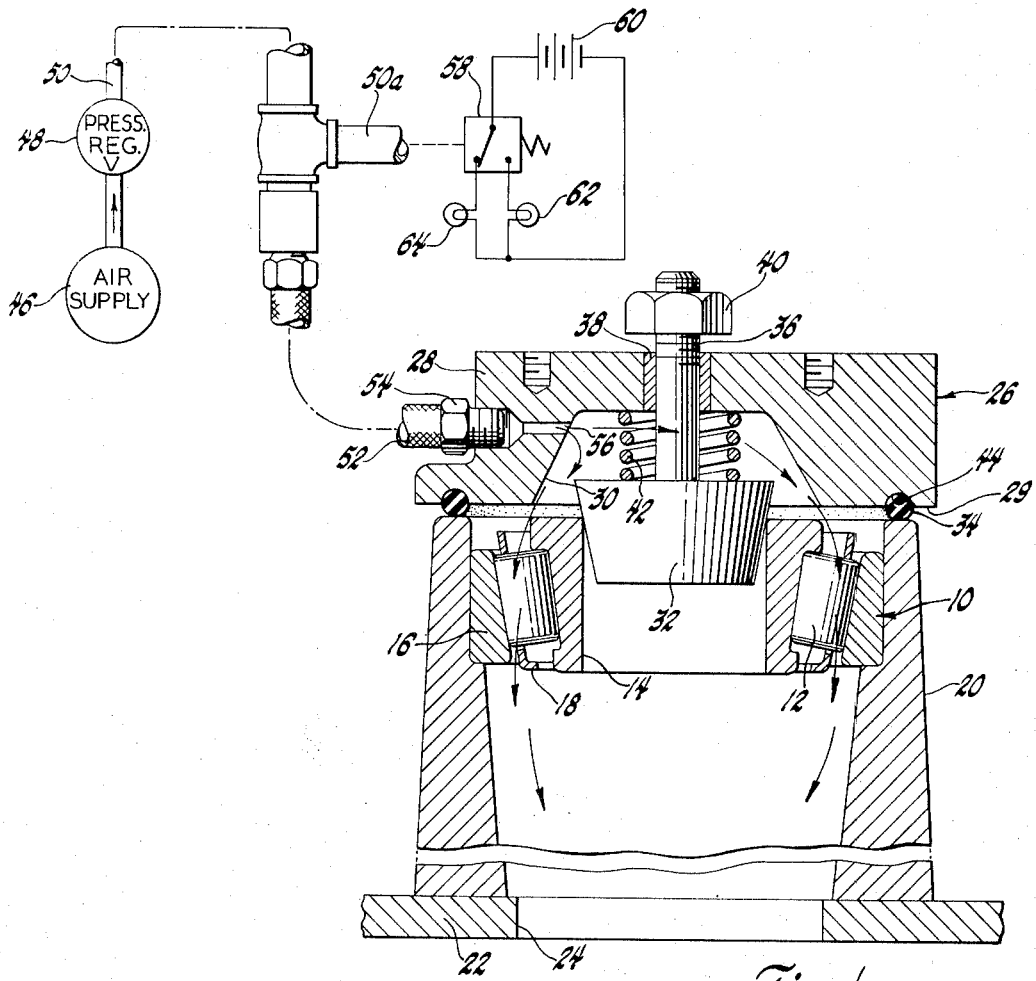

United States Patent
Eichler et al.

[15] 3,683,673
[45] Aug. 15, 1972

[54] NON-DESTRUCTIVE TEST APPARATUS AND METHOD FOR GREASE PACKED BEARINGS

[72] Inventors: Richard H. Eichler, Flint; John G. Simon, Saginaw, both of Mich.

[73] Assignee: General Motors Corporation, Detroit, Mich.

[22] Filed: April 29, 1971

[21] Appl. No.: 138,493

[52] U.S. Cl. ........................73/37, 73/38, 73/46
[51] Int. Cl. ..............................................G01m 3/02
[58] Field of Search...........73/37, 40, 49.7, 38, 46; 33/DIG. 2

[56] References Cited

UNITED STATES PATENTS

| | | | |
|---|---|---|---|
| 3,097,521 | 7/1963 | Dega | 73/40 |
| 3,188,855 | 6/1965 | Dega | 73/37 |
| 3,413,855 | 12/1968 | Bloom | 73/38 X |

*Primary Examiner*—Louis R. Prince
*Assistant Examiner*—William A. Henry II
*Attorney*—Jean L. Carpenter and Arthur N. Krein

[57] ABSTRACT

A nondestructive test apparatus and method for checking grease packed bearings in which the inner and outer races to be tested are sealed and then low pressure aeriform fluid is directed to the portion of the bearing packed with grease between these races whereby, if there is relatively free flow of this fluid therethrough, it indicates the absence of grease or less than complete coverage of grease in the bearing.

6 Claims, 2 Drawing Figures

PATENTED AUG 15 1972  3,683,673

INVENTORS
Richard H. Eichler &
BY  John G. Simon

Arthur N. Krein
ATTORNEY

NON-DESTRUCTIVE TEST APPARATUS AND METHOD FOR GREASE PACKED BEARINGS

This invention relates to a nondestructive test apparatus and method for checking of grease packed bearings or bearing assemblies to automatically determine if a bearing has been properly greased.

In grease lubricated bearings, whether roller or ball bearings, it is essential that sufficient grease be originally packed into the bearing to permit adequate lubrication at all contact points within the bearing so that the moving parts of the rolling elements of the bearings are supported on an oil film. If insufficient grease is not originally provided in the bearing, the bearing elements may not be adequately lubricated originally or, upon operation of the bearing, channeling may occur whereby the inadequate supply of grease is plowed aside and fails to remain in contact with the moving parts during operation of the bearing.

On the other hand, if the bearing is initially properly greased, an adequate supply of grease will be maintained in the bearing to prevent galling or other damage caused by metal to metal contact in the bearing and this supply of grease will serve to absorb and dissipate the heat caused by friction during bearing operation. An adequate supply of grease in the bearing will also protect the highly polished raceway and rolling element surfaces from moisture.

For bearings required to operate under normal operating conditions, the total amount of grease packed into the bearings should be such as to fill between 25 to 40 percent of the air space of the bearing chamber, the percentage of grease required being directly related to the type of operating condition to which the bearing will be subjected.

Under normal production procedures, this grease is packed into the bearing automatically from one or both sides of the bearing again depending on the type of bearing which is to be packed. However, before such a supposedly grease packed bearing is subjected to an operating load, it would be desirable to have a means or method whereby these bearings can be checked to determine if the bearing has actually received a sufficient initial charge of grease. If during checking, the bearing is found to contain an inadequate supply of grease, it can be repacked with grease before it is placed under an operating load.

Accordingly, it is the principal object of this invention to provide apparatus and method for determining if an adequate supply of grease has been packed into the bearing chamber of a bearing.

Another object of this invention is to provide apparatus and method whereby the presence and coverage of grease within a bearing can be readily determined.

These and other objects of the invention are attained by means of an air test apparatus and method whereby one end of the bearing is sealed to provide an air chamber adjacent to the rolling elements of the bearing. Low pressure aeriform fluid, such as air, is then directed into the portion of the bearing which is supposed to have been packed with an adequate supply of grease. Free or relatively free flow of aeriform fluid through the bearing then indicates the absence of grease or less than complete grease coverage within the bearing. A sufficiently high back pressure and reduced aeriform fluid flow, on the other hand, would indicate complete coverage and good packing of grease within the bearing. In addition, depending on the aeriform fluid pressure used during this test, poor packing is also indicated by grease "blow through" with subsequent aeriform fluid flow through the bearing and a reduction in the back pressure of the aeriform fluid.

Figure 2:
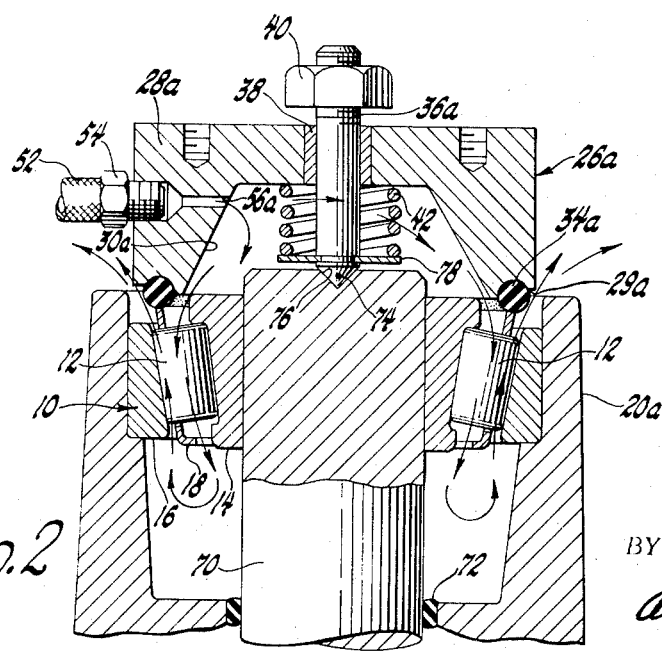

For a better understanding of the invention as well as other objects and further features thereof, reference is had to the following detailed description of the invention to be read in connection with the accompanying drawings wherein:

FIG. 1 is a partly schematic sectional view of an automatic grease checking device wherein the bearing is mounted in a subassembly in such a manner that aeriform fluid flow is not restricted beyond the bearing by any part of the assembly; and, FIG. 2 is a sectional view similar to that of FIG. 1 illustrating one device for checking grease packed bearings in a subassembly or assembly where the aeriform fluid flow is restricted beyond the bearing by part of the assembly.

Referring now to FIG. 1, there is illustrated a test setup for checking for adequate grease in a bearing wherein the bearing to be tested is mounted in such a manner that aeriform fluid flow is not obstructed beyond the bearing as mounted in a test fixture or mounted in part of an assembly or subassembly in which it is to be used as part of a finished product. Such a bearing 10, shown for purposes of illustration only as a roller bearing, includes rollers 12 positioned in rolling contact between an inner race 14 and an outer race 16, with the rollers being retained in spaced apart relation to each other between these races by means of a cage 18.

The bearing 10, which has supposedly previously been packed with grease, not shown, is mounted by its outer race 16 in a suitable test fixture or, preferably as shown, in a bearing housing 20 forming part of a subassembly or assembly of which the bearing is to be a part. During testing of the bearing, the bearing housing 20 is supported on a suitable fixed support 22 having aperture 24 therein.

To test the bearing to determine if sufficient grease has previously been packed therein, the bearing is sealed relative to its inner and outer races and then low pressure aeriform fluid is directed to the portion of the bearing between these races which is supposed to have been packed with grease.

In the embodiment shown in FIG. 1, this is effected by means of a bearing test fixture, generally designated 26, which includes a seal body 28 in the form of an inverted cup with a bottom rim 29 and having a central cavity 30 therein, the seal body supporting an inner seal 32 and an annular outer seal 34. The inner seal 32, in the form of a truncated cone, is fixed to a stub shaft 36 slidably journaled in bearing 38 fixed in the seal body 28. The axial movement of the stub shaft in one direction, down as shown in FIG. 1, is limited by means of a stop nut 40 threaded to the upper end of the stub shaft which is then normally biased in this direction by means of a coil spring 42 encircling the stub shaft with one end of the spring in engagement with the inner seal 32 and its other end engaging the seal body 28. The outer seal 34 is fixed in a suitable annular recess 44 provided for this purpose in the rim 29 of the seal body concentric with the inner seal 32.

In operation, the bearing test fixture 26 which can be hand held or preferably fixed to a suitable press, not shown, is placed over the bearing assembly and then forced down into the position shown in FIG. 1 into sealing engagement with the bearing assembly, the spring biased inner seal 32, because of its tapered outer surface, serving to center the bearing assembly with respect to the bearing test fixture. The outer seal 34 can be positioned on the seal body 28 for engagement with the outer race 16 of the bearing or, preferably as shown, it is positioned to come into sealing engagement with the top surface of the bearing housing 20.

Low pressure aeriform fluid, such as air from an air supply 46, is delivered through a pressure regulator 48, set at a suitable low pressure, for example, from 10 to 15 pounds per square inch gauge pressure, via air conduit 50, flexible hose 52 and coupling 54 threaded into the seal body in communication with radial passage 56 in seal body 28, which is in communication with cavity 30. As shown in FIG. 1, cavity 30 is in communication on one side of the bearing with the bearing portion between the inner race 14 and outer race 16.

In addition, air conduit 50 is connected by conduit 50a to a suitable signal device to indicate a drop in air pressure if there is rapid flow of fluid through the bearing 10, such flow being in the direction of the arrows in FIG. 1. In the embodiment shown, the conduit 50a is connected to a low air pressure switch 58 used to complete the circuit from a power source 60 to either a visual indicator, such as lamp 62, or a visual indicator, such as lamp 64, depending on the air pressure in this circuit. Preferably, the lamps 62 and 64 are of different colors such as green and red so that these different colored lamps will provide a visual indication to the operator of the presence or absence of adequate grease in the bearing during testing.

If the bearing being tested has previously been packed with a sufficient quantity of grease for proper lubrication of the bearing, there will be sufficient grease packed around the rollers 12 and cage 18 between the inner race 14 and the outer race 16 to prevent the free flow of air through the portion of the bearing between these races so that air pressure in the cavity 30 will build up to normal line pressure when the bearing test fixture is positioned in sealing engagement with the bearing and the bearing housing. This normal line pressure acting on pressure switch 58 will effect closing of the contact to energize visual indicator 62 to provide a signal to the operator that the bearing being tested is properly packed with grease. However, if the bearing has not been packed with sufficient grease to provide proper lubrication of the bearing, then this lack of sufficient grease in the bearing will permit the relative free flow of air through the flow path in the bearing between the inner race 14 and outer race 16 as shown by arrows in FIG. 1, to prevent a buildup of normal line pressure in cavity 30 and conduits 50 and 50a, and this lower air pressure acting on pressure switch 58 will effect energization of visual indicator 64 to provide a signal to the operator that the bearing is not properly packed with grease.

In FIG. 2, there is illustrated an embodiment of a test setup for use in testing a bearing in an arrangement wherein air flow is restricted beyond the bearing by part of the bearing support element. In this embodiment, the bearing 10 is mounted in a suitable test fixture or preferably, as shown, it is mounted as part of a subassembly in which a shaft 70 is journaled by the bearing in a housing 20a, the inner race 14 of the bearing encircling shaft 70 and the outer race 16 of the bearing being mounted in the housing 20a. An annular seal 72 carried by the housing 20a encircles the shaft 70 in sealing engagement therewith.

With the bearing 10 mounted in this manner, the bearing is tested by sealing it intermediate its inner and outer races by a seal positioned to engage one end of the bearing cage 18 and then, low pressure aeriform fluid is directed to the portion of the bearing between the inner race 14 and the cage 18.

The test fixture, generally designated 26a, for use with this arrangement, as shown in FIG. 2, includes a seal body 28a in the form of an inverted cup having a central cavity 30a therein. An annular seal 34a is carred in a groove in the bottom rim 29a of the seal body in position to be engagable with the exposed edge of the bearing cage 18.

To effect proper location of the seal 34a with respect to the bearing cage 18, the test fixture is provided with a locating center in the form of a stub shaft 36a slidably journaled in a bearing 38 fixed in the seal body 28a. The stub shaft is provided at one end with a conical centering point 74 for engagement into centering aperture 76 provided in the end of shaft 70. The axial movement of the stub shaft in one direction, down as shown in FIG. 2, is limited by means of a stop nut 40 threaded to the upper end of the stub shaft, the stub shaft being normally biased in this direction by means of a coil spring 42 encircling the stub shaft with one end of the spring in engagement with the split retainer washer 78 secured in a suitable groove provided for this purpose on the stub shaft and its other end engaging the seal body 28a.

Cavity 30a in seal body 28a is connected by radial passage 56a to a source of low pressure aeriform fluid, such as air, in the same manner as described in connection with seal body 28.

In the operation of the embodiment of FIG. 2, if there is insufficient grease packed in the bearing 10, relative free flow of air will occur down through the portion of the bearing between inner race 14 and cage 18 and then back up through the portion of the bearing between cage 18 and outer race 16, a flow path as shown by the direction arrows in FIG. 2.

Referring again to the bearing mounting arrangement of FIG. 1 wherein free flow of aeriform fluid is not restricted beyond the bearing, if the inner diameter of the inner race 14 of the bearing is sealed air tight as by being fixed to a shaft, such as shaft 70 of FIG. 2, then the inner seal 32 of this test fixture 26 will not be required and can be replaced by centering device similar to that used in test fixture 26a.

What is claimed is:

1. A method for checking grease packed bearings to determine if a sufficient quantity of grease has been packed into the portion of the bearing containing its rolling elements positioned between its inner race and outer race, said method including the steps of sealing the inner and outer races of the bearing and sealing one end of the bearing to provide an air chamber adjacent to the rolling elements in the portion of the bearing between its inner and outer races and, then directing low pressure aeriform fluid to this portion of the bearing, with free flow of aeriform fluid through this portion of the bearing indicating the lack of sufficient grease within the bearing whereas restricted flow of aeriform fluid through this portion indicates the presence of sufficient grease within the bearing.

2. Apparatus for checking grease packed bearings to determine if sufficient grease has been packed in the portion of the bearing between its inner and outer races containing the cage and rolling elements of the bearing, said apparatus including support means for sealing the outer diameter of the outer race of the bearing, means for sealing the inner diameter of the inner race of the bearing, a seal body provided at one end with an annular rim encircling a cavity provided in said seal body, an annular seal secured to said rim, said seal body being adapted to be positioned over the exposed end of the bearing to provide, with said cavity in said seal body, an air chamber over the end of the bearing adjacent to the portion of the bearing between its inner and outer races, means in communication with said cavity to supply low pressure aeriform fluid at a predetermined pressure to the portion of the bearing between its inner and outer races and, indicator means operatively connected to said cavity to indicate the relative pressure of aeriform fluid in said cavity.

3. Apparatus according to claim 2 wherein said means for sealing the inner diameter of the inner race of the bearing is a spring biased inner seal means slidably journaled in said seal body within said cavity, said inner seal means including a truncated, cone-shaped, seal element adapted for insertion into the inner race of the bearing for sealing engagement therewith and, wherein said annular seal is positioned on said rim of said seal body to effect a seal relative to said outer race.

4. Apparatus according to claim 2 wherein said means for sealing the inner diameter of the inner race of the bearing is a shaft supported in said support means by the bearing, with said shaft and said support means being positioned to seal off one side of the bearing opposite said air chamber and, wherein said annular seal is positioned on said rim of said seal body so as to engage one end of the cage of the bearing when said seal body is positioned over the exposed end of the bearing.

5. Apparatus according to claim 4 wherein said seal body includes spring biased, centering means slidably journaled in said seal body for engagement with said shaft for centering said seal body relative to said shaft.

6. Apparatus according to claim 2 wherein said indicator means includes a first visual indicator lamp and a second visual indicator lamp, and pressure actuated switch means operatively connected to a source of electrical power and responsive to fluid pressure in said cavity to selectively connect said first visual indicator lamp and said second visual indicator lamp to said source of electrical power.

* * * * *